(12) United States Patent
Lal et al.

(10) Patent No.: US 11,627,096 B2
(45) Date of Patent: Apr. 11, 2023

(54) BANDWIDTH AWARENESS IN A LINK AGGREGATION GROUP

(71) Applicant: Cisco Technology, Inc., San Jose, CA (US)

(72) Inventors: Roshan Lal, San Jose, CA (US); Rishi Chhibber, Dublin, CA (US); Padmanab Pathikonda, Mountain House, CA (US); Lakshmi Priya Sarma, Milpitas, CA (US); Francesco Meo, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 981 days.

(21) Appl. No.: 16/431,649

(22) Filed: Jun. 4, 2019

(65) Prior Publication Data
US 2020/0389413 A1  Dec. 10, 2020

(51) Int. Cl.
*H04L 47/74* (2022.01)
*H04L 45/24* (2022.01)
*H04L 47/76* (2022.01)
*H04L 45/00* (2022.01)
*H04L 47/783* (2022.01)

(52) U.S. Cl.
CPC ............ *H04L 47/745* (2013.01); *H04L 45/22* (2013.01); *H04L 45/245* (2013.01); *H04L 47/76* (2013.01); *H04L 47/783* (2013.01)

(58) Field of Classification Search
CPC ..... H04L 47/745; H04L 45/22; H04L 45/245; H04L 47/76; H04L 47/783; H04L 47/125; H04L 47/726; H04L 47/74; Y02D 30/50
See application file for complete search history.

(56) References Cited

U.S. PATENT DOCUMENTS

| | | | | |
|---|---|---|---|---|
| 8,284,654 B2* | 10/2012 | Bitar | ....................... | H04L 47/70 370/216 |
| 9,565,594 B2* | 2/2017 | Du | ....................... | H04W 28/065 |
| 2011/0261829 A1* | 10/2011 | Solomon | ............... | H04L 47/728 370/401 |
| 2013/0286818 A1* | 10/2013 | Long | ................... | H04L 41/0654 370/222 |
| 2014/0198661 A1* | 7/2014 | Raman | ................... | H04L 65/611 370/235 |
| 2014/0204729 A1* | 7/2014 | Zhang | ................... | H04L 45/245 370/218 |
| 2015/0282005 A1* | 10/2015 | Du | ........................ | H04W 84/12 370/394 |

* cited by examiner

*Primary Examiner* — Afshawn M Towfighi

(74) *Attorney, Agent, or Firm* — Baker Botts L.L.P.

(57) ABSTRACT

In one embodiment, a method includes receiving a request to establish a path for a data stream from the first network apparatus to a second network apparatus, where the request is associated with a requested bandwidth for the data stream, and where the first network apparatus and the second network apparatus are connected by a link aggregation group including a number of physical links, accessing bandwidth information representing a number of remaining bandwidths of the respective multiple of physical links, determining that the requested bandwidth is not satisfied by any of the number of remaining bandwidths of the number of physical links, and sending a response rejecting the request to establish the path.

19 Claims, 9 Drawing Sheets

BANDWIDTH AWARENESS IN A LINK AGGREGATION GROUP

TECHNICAL FIELD

The present disclosure relates generally to a field of data communications, and more particularly, to bandwidth awareness in a link aggregation group.

BACKGROUND

With emerging IP Fabric for Media, content providers and broadcasters may be able to migrate from legacy Serial Digital Interface (SDI) to an IP-based infrastructure. The IP-based infrastructure may be flexible and scalable to meet the evolving demand for more content and rich media experiences, including, but not limited to, more camera feeds, higher resolutions, and virtual reality capabilities. Media traffic may be provided as multicast streams in the IP-based infrastructure. Link aggregation may be used for increasing the bandwidth available between network nodes in the IP-based infrastructure, especially for IP Fabric for Media. Traffic in IP Fabric for Media may require guaranteed-bandwidth infrastructure.

DESCRIPTION OF EXAMPLE EMBODIMENTS

Overview

In particular embodiments, a first network apparatus may receive a first request to establish a first path for a first data stream from the first network apparatus to a second network apparatus. The first request may be associated with a first requested bandwidth for the first data stream. The first network apparatus and the second network apparatus may be connected by a link aggregation group comprising a plurality of physical links. The first network apparatus may access bandwidth information representing a plurality of remaining bandwidths of the respective plurality of physical links. The first network apparatus may determine that the first requested bandwidth is not satisfied by any of the plurality of remaining bandwidths of the plurality of physical links. The first network apparatus may send a response rejecting the first request to establish the first path based on the determination.

In particular embodiments, a second network apparatus may identify a first network apparatus from which to receive a data stream. The first network apparatus and the second network apparatus are connected by a link aggregation group comprising a plurality of physical links. The second network apparatus may access bandwidth information associated with the link aggregation group. The second network apparatus may determine that a remaining ingress bandwidth associated with the link aggregation group satisfies a requested bandwidth for receiving the data stream based on the bandwidth information. The second network apparatus may send a request for establishing a first path between the first network apparatus to the second network apparatus with the requested bandwidth to the first network apparatus.

Example Embodiments

Figure 1:
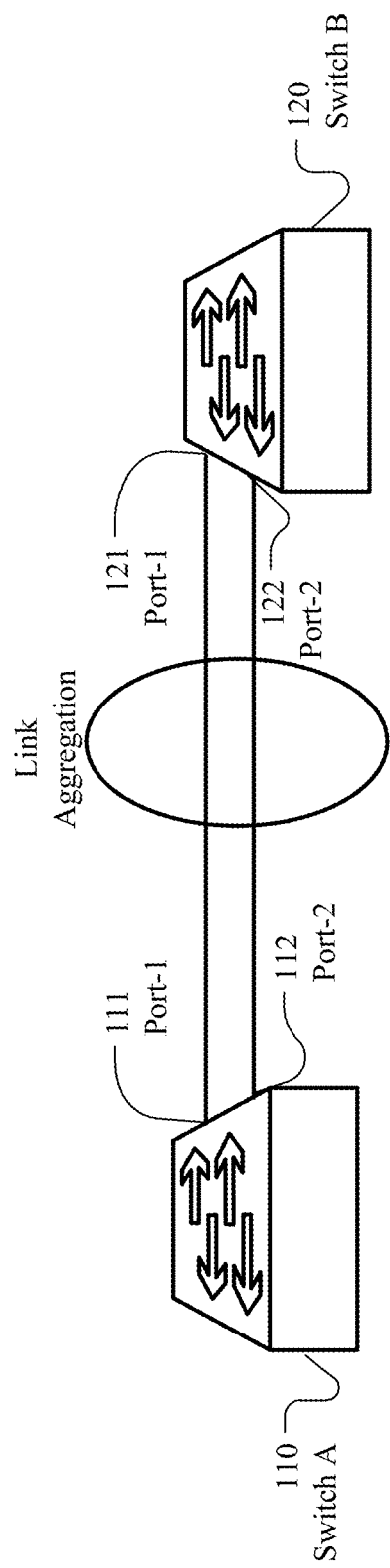
FIG. 1 illustrates an example link aggregation between two switches.

Link aggregation may address two problems with Ethernet connections: bandwidth limitations and lack of resilience. With regard to the first issue: bandwidth requirements may not scale linearly. Ethernet bandwidths historically have increased tenfold each generation: 10 megabit/s, 100 Mbit/s, 1000 Mbit/s, 10,000 Mbit/s. Upgrading to the next generation to increase bandwidth of a link may be cost prohibitive. The second problem may involve the three single points of failure in a typical port-cable-port connection. In either the usual computer-to-switch or in a switch-to-switch configuration, the cable itself or either of the ports the cable is plugged into can fail. Link aggregation may combine (aggregate) multiple network connections in parallel in order to increase throughput beyond what a single connection could sustain, and to provide redundancy in case one of the links should fail. A Link Aggregation Group (LAG) may combine a number of physical ports together to make a single high-bandwidth data path, so as to implement the traffic load sharing among the member ports in the group and to enhance the connection reliability. EtherChannel may be a proprietary link aggregation solution from CISCO®. EtherChannel may allow grouping of several physical Ethernet links to create one logical Ethernet link for the purpose of providing fault-tolerance and high-speed links between switches, routers and servers. EtherChannel may be primarily used in a backbone network. But, EtherChannel can also be used to connect end user machines. FIG. 1 illustrates an example link aggregation between two switches. Switch A 110 has a connection to switch B 120 with link aggregation. Port-1 111 of switch A 110 has a connected link to port-1 121 of switch B 120. Port-2 112 of switch B 110 has a connected link to the port-2 122 of switch B1 120. The two links between switch A and switch B may be aggregated to form a logical layer 2 link. With the aggregated link, the data bandwidth between switch A and switch B may become higher. Also, the connection reliability may increase as the connection between switch A and switch B may exist even if one of the physical links fails.

Internet Group Management Protocol (IGMP) is a communications protocol used by hosts and adjacent routers on Internet Protocol Version 4 (IPv4) networks to establish multicast group memberships. IGMP may be used for one-to-many networking applications such as online streaming video and gaming. IGMP may allow more efficient use of resources when supporting these types of applications. IGMP may be used on IPv4 networks. Multicast management on IPv6 networks may be handled by Multicast Listener Discovery (MLD) which is a part of ICMPv6 in contrast to IGMP's bare IP encapsulation.

Figure 2:
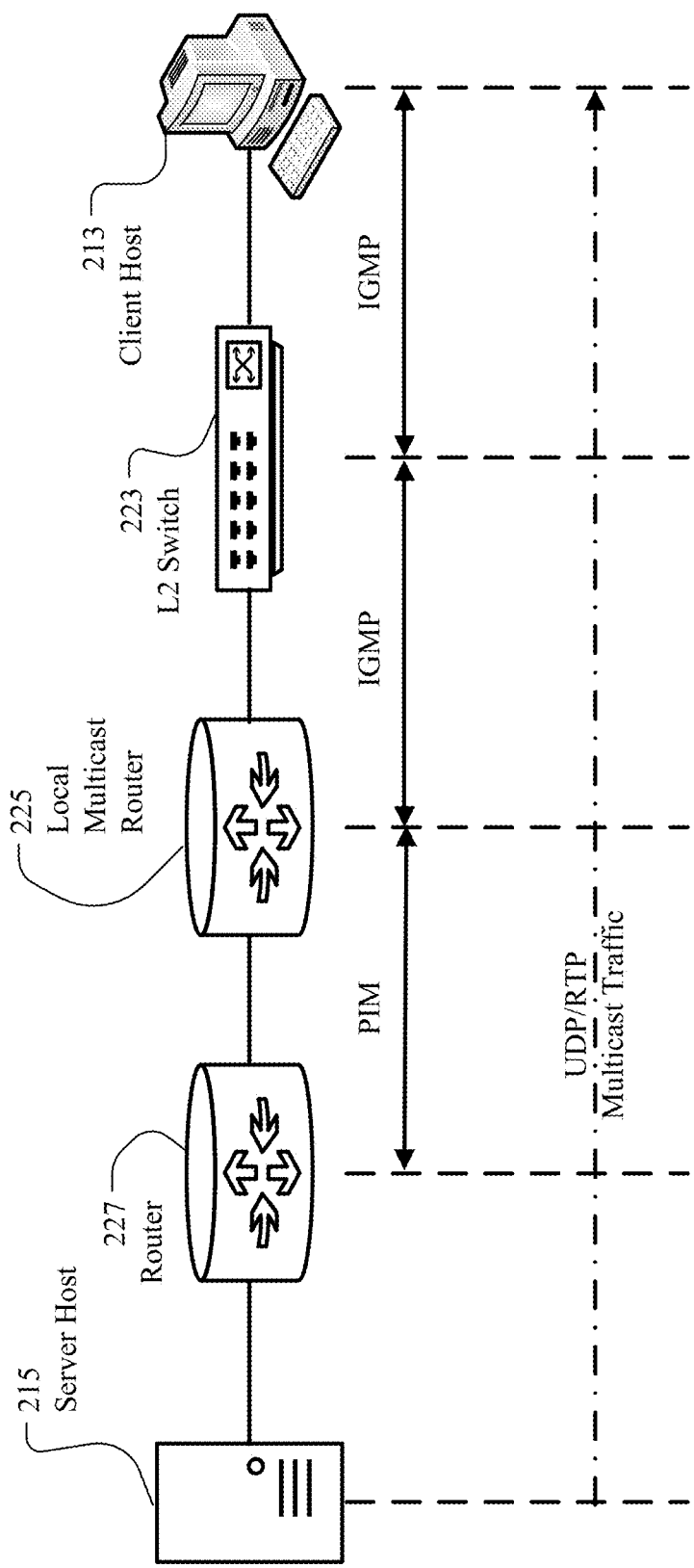
FIG. 2 illustrates an example architecture for delivering a multicast service.

FIG. 2 illustrates an example architecture for delivering a multicast service. IGMP may operate between a client host 213 and a local multicast router 225. Switches 223 featuring IGMP snooping may derive useful information by observing these IGMP transactions. Protocol Independent Multicast (PIM) is then used between the local multicast router 225 and remote multicast routers 227, to direct multicast traffic from a server host 215 sending multicasts to hosts that have registered through IGMP to receive them. IGMP may operate on the network layer. IGMP protocol may be implemented on a particular host and within a router. A client host 213 may request membership to a group through the local multicast router 225 while the local multicast router 225 may listen for these requests and periodically sends out subscription queries. A single router per subnet may be elected to perform this querying function.

Protocol Independent Multicast (PIM) is a family of multicast routing protocols for Internet Protocol (IP) networks that provide one-to-many and many-to-many distribution of data over a Local Area Network (LAN), Wide Area Network (WAN) or the Internet. PIM may not include its own topology discovery mechanism, but instead may use routing information supplied by other routing protocols. PIM may not be dependent on a specific unicast routing protocol: PIM can make use of any unicast routing protocol in use on the network. PIM may not build its own routing tables. PIM may use the unicast routing table for reverse path forwarding.

FIG. 3A-FIG. 3D illustrate example scenarios of establishing a path over a link aggregation group for guaranteed-bandwidth data streams.

Figure 3A:
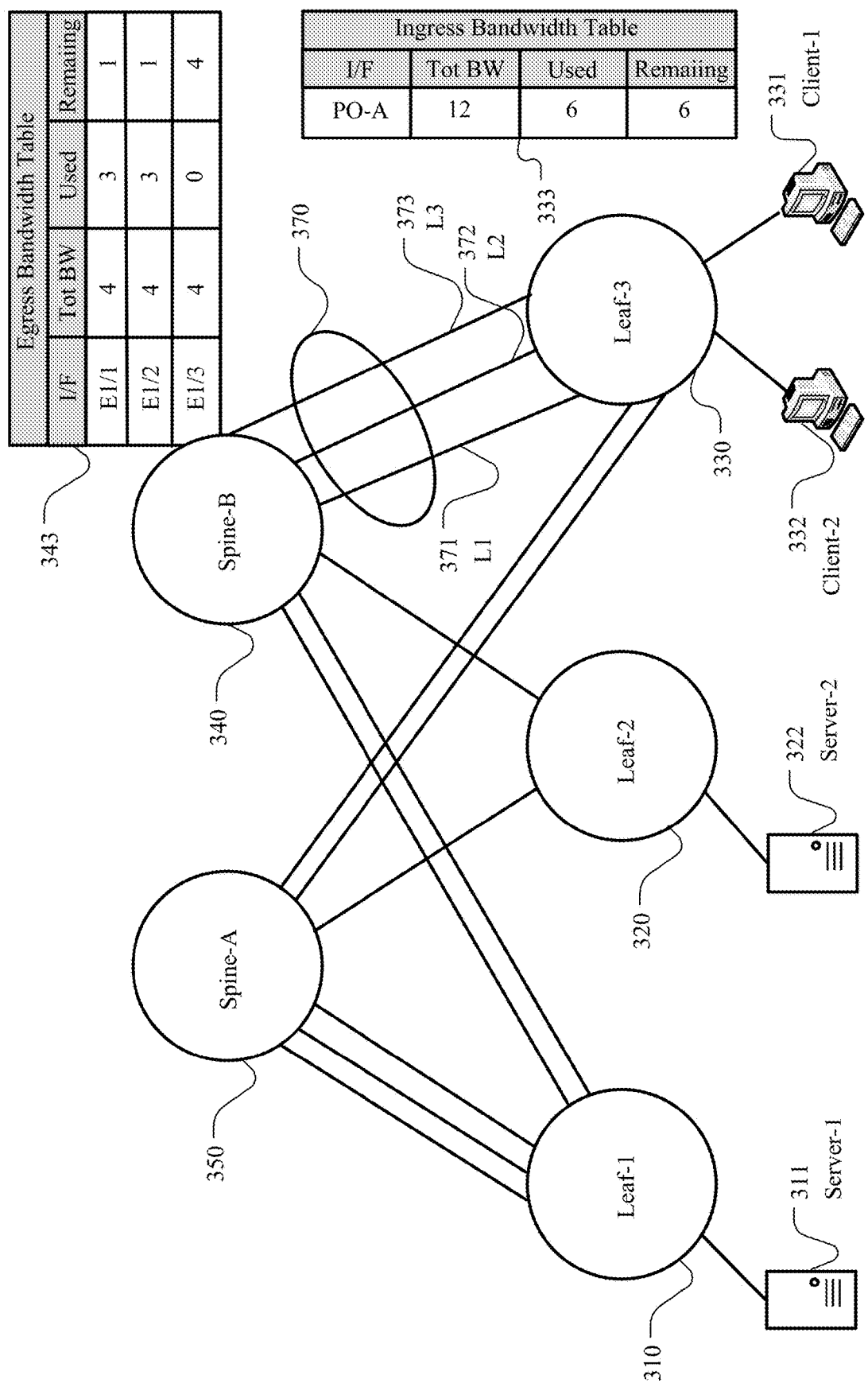
FIG. 3A illustrates an example scenario where two network apparatuses are connected by a link aggregation group.

In particular embodiments, a first network apparatus and the second network apparatus may be connected by a link aggregation group comprising a plurality of physical links. FIG. 3A illustrates an example scenario where two network apparatuses are connected by a link aggregation group. As an example and not by way of limitation, illustrated in FIG. 3A, Spine-B 340, the first network apparatus, is connected to Leaf-3 330, the second network apparatus, by a link aggregation group 370. The link aggregation group 370 may comprise three physical links L1 371, L2 372, and L3 373. A directional capacity of each physical link in the link aggregation group 370 may be 4 Gbps. The link aggregation group may be an EtherChannel of CISCO®. Although this disclosure describes two network apparatuses connected by a link aggregation group in a particular manner, this disclosure contemplates two network apparatuses connected by a link aggregation group in any suitable manner.

In particular embodiments, the first network apparatus 340 may manage an egress bandwidth table 343 for the link aggregation group 370. The egress bandwidth table 343 may comprise a total bandwidth, a used bandwidth, and a remaining bandwidth for each of the plurality of physical links. Each of the plurality of physical links may be associated with zero or more streams. The total bandwidth for a physical link may be an egress capacity of the physical link. The used bandwidth for a physical link may be a sum of required egress bandwidth for the zero or more streams associated with the physical link. The remaining bandwidth for a physical link may be calculated as a subtraction of the used bandwidth from the total bandwidth. As an example and not by way of limitation, illustrated in FIG. 3A, the egress bandwidth table 343 for Spine-B 340 comprises the total bandwidth, the used bandwidth, and the remaining bandwidth for interfaces E1/1, E1/2, E1/3, where the interface E1/1 is connected to the link L1 371, the interface E1/2 is connected to the link L2 372, and the interface E1/3 is connected to the link L3. Because the capacity of each link in the link aggregation group 370 is 4 Gbps, the total bandwidth for each interface E1/1, E1/2, and E1/3 is 4 Gbps.

In the example illustrated in FIG. 3A, each of the links L1 and L2 is utilized by one or more egress streams while the link L3 is not associated with any egress stream. Total required egress bandwidth for the one or more streams associated with L1 is 3 Gbps. Thus, the used bandwidth for interface E1/1 in the egress bandwidth table 343 is 3 Gbps. Total required egress bandwidth for the one or more streams associated with L2 is 3 Gbps. Thus, the used bandwidth for interface E1/2 in the egress bandwidth table 343 is 3 Gbps. Although this disclosure describes managing egress bandwidth information per link in a link aggregation group in a particular manner, this disclosure contemplates managing egress bandwidth information per link in a link aggregation group in any suitable manner.

In particular embodiments, the first network apparatus may update the bandwidth information for the link aggregation group when an association of a stream to a physical link is created, removed, or modified. The bandwidth information associated with each of the plurality of physical links is updated based on any egress bandwidth allocated to any stream utilizing that physical link. Although this disclosure describes updating the bandwidth information for a link aggregation group in a particular manner, this disclosure contemplates updating the bandwidth information for a link aggregation group in any suitable manner.

In particular embodiments, the second network apparatus 330 may manage an ingress bandwidth table 333 for the link aggregation group 370. The ingress bandwidth table 333 may comprise a total ingress bandwidth, a used ingress bandwidth, and a remaining ingress bandwidth for the whole link aggregation group. The total ingress bandwidth may be an aggregation of ingress capacities of the plurality of physical links. The used ingress bandwidth may be a sum of required ingress bandwidth for zero or more streams associated with the link aggregation group. The remaining ingress bandwidth may be calculated as a subtraction of the used bandwidth from the total bandwidth. As an example and not by way of limitation, illustrated in FIG. 3A, the aggregation of ingress capacities of the links L1 371, L2 372 and L3 373 is 12 Gbps. Thus, the total ingress bandwidth in the ingress bandwidth table 333 is 12 Gbps. Because 3 Gbps is required for the one or more streams associated with the link L1 371 and 3 Gbps is required for the one or more streams associated with the link L2 372, the total used ingress bandwidth for the link aggregation group 370 at leaf-3 330 is 6 Gbps. As a result, the remaining ingress bandwidth for the link aggregations group 370 at Leaf-3 330 is 6 Gbps. Although this disclosure describes managing an ingress bandwidth information in a particular manner, this disclosure contemplates managing an ingress bandwidth information in any suitable manner.

In particular embodiments, the one or more streams associated with a physical link may be hashed into the physical link. The one or more streams associated with a physical link may be transmitted through the physical link. As an example and not by way of limitation, illustrated in FIG. 3A, the link L1 371 is associated with a stream that requires 3 Gbps. The stream is hashed into the interface E1/1, the interface connected to the link L1 371. Whenever a packet belonging to the stream arrives to Spine-B 340, the packet is sent to Leaf-3 330 through the link L1. Although this disclosure describes associating a stream to a physical link in a particular manner, this disclosure contemplates associating a stream to a physical link in any suitable manner.

In particular embodiments, a second network apparatus 330 may receive, from a client node, a first request to establish a first-routing path for a first data stream. In particular embodiments, the first data stream may be a multicast stream. In particular embodiments, the first request may be an IGMP join message requesting to join to a multicast group. The first request may be associated with a first requested bandwidth for the first data stream. The second network apparatus 330 may identify the first network apparatus 340 from which to receive the first data stream based on routing algorithms. In particular embodiments, the first network apparatus 340 may be a next network apparatus in a reversed routing path based on reverse-path forwarding algorithms. The second network apparatus 330 may access bandwidth information associated with the link aggregation group. The bandwidth information associated with the link aggregation group may be available as an ingress bandwidth table 333. The second network apparatus 330 may determine that the remaining ingress bandwidth associated with the link aggregation group satisfies a requested bandwidth for receiving the data stream based on the bandwidth information. The second network apparatus 330 may send to the first network apparatus 340 a request for establishing a first path between the first network apparatus to the second network apparatus with the requested bandwidth. As an example and not by way of limitation, illustrated in FIG. 3A, a client-1 331 may want to join to a multicast group G1 sourced from a server-1 311, which belongs to Leaf-1 310. The multicast stream associated with the multicast group G1 may require 3 Gbps bandwidth. Leaf-3 330 may receive an IGMP Join request from the client-1 331. The IGMP Join request may comprise the requested bandwidth, 3 Gbps. Leaf-3 330 may perform a Multicast Reverse-Path Forwarding (M-RPF) lookup. Leaf-3 330 may identify Spine-B 340 as the next network apparatus in the reversed routing path for the multicast stream based on the M-RPF lookup. Because Leaf-3 330 is connected to Spine-B 340 by a link aggregation group 370, Leaf-3 330 may determine if the remaining ingress bandwidth satisfies the requested bandwidth using the ingress bandwidth table 333. Since the remaining ingress bandwidth 6 Gbps is greater than the requested bandwidth 3 Gbps for the multicast stream, Leaf-3 330 may send a Protocol Independent Multicast (PIM) Join request to Spine-B 340. Although this disclosure describes requesting to establish a path over a link aggregation group for a multicast stream in a particular manner, this disclosure contemplates requesting to establish a path over a link aggregation group for a multicast stream in any suitable manner.

In particular embodiments, the first network apparatus 340 may receive the request to establish a first path for the first data stream. The first path may be between the first network apparatus 340 to the second network apparatus 330. The first network apparatus 340 and the second network apparatus 330 may be connected by a link aggregation group 370. The request may be associated with a first requested bandwidth. The first network apparatus 340 may access the egress bandwidth information associated with the link aggregation group 370. The egress bandwidth information associated with the link aggregation group 370 may be the egress bandwidth table 343. The first network apparatus 340 may determine that the remaining bandwidth of one physical link among the plurality of physical links satisfies the second requested bandwidth. The first network apparatus may update the bandwidth information associated with the one physical link based on the second requested bandwidth. As an example and not by way of limitation, illustrated in FIG. 3A, continuing with a prior example, Spine-B 340 may receive the PIM Join request from the second network apparatus 330. The received PIM Join request may comprise the first requested bandwidth associated with the first data stream. Spine-B 340 may determine that the remaining bandwidth of link L3 373 satisfies the first requested bandwidth. Spine-B 340 may add the first requested bandwidth, 3 Gbps, to the used bandwidth of the interface E1/3, which is connected to the link L3. Spine-B 340 may subtract the first requested bandwidth 3 Gbps from the remaining bandwidth of the interface E1/3. Spine-B 340 may perform an M-RPF lookup to determine that Leaf-1 310 is a next network apparatus in the reversed routing path. In particular embodiments, Spine-B 340 may utilize any suitable multicast routing discovery algorithms to determine the next network apparatus in the reversed routing path. The first network apparatus 340 may send a PIM Join request to Leaf-1 310. Although this disclosure describes establishing an egress path over a link aggregation group for a multicast stream in a particular manner, this disclosure contemplates establishing an egress path over a link aggregation group for a multicast stream in any suitable manner.

In particular embodiments, the second network apparatus 330 may update the ingress bandwidth information for the link aggregation group 370. The bandwidth information associated with the link aggregation group 370 may be the ingress bandwidth table 333. The bandwidth information associated with the link aggregation group 370 may be updated based on any ingress bandwidth allocated to any ingress stream over the link aggregation group. In particular embodiments, the second network apparatus 330 may update the ingress bandwidth information for the link aggregation group 370 upon receiving a response indicating that the request to establish a path over the link aggregation group is accepted from the first network apparatus 340. As an example and not by way of limitation, illustrated in FIG. 3A, continuing with a prior example, Leaf-3 330 may update the ingress bandwidth table 333 by adding the first requested bandwidth 3 Gbps to the used bandwidth and subtracting the first requested bandwidth 3 Gbps from the remaining bandwidth. Although this disclosure describes updating the ingress bandwidth information for a link aggregation group in a particular manner, this disclosure contemplates updating the ingress bandwidth information for a link aggregation group in any suitable manner.

Figure 3B:
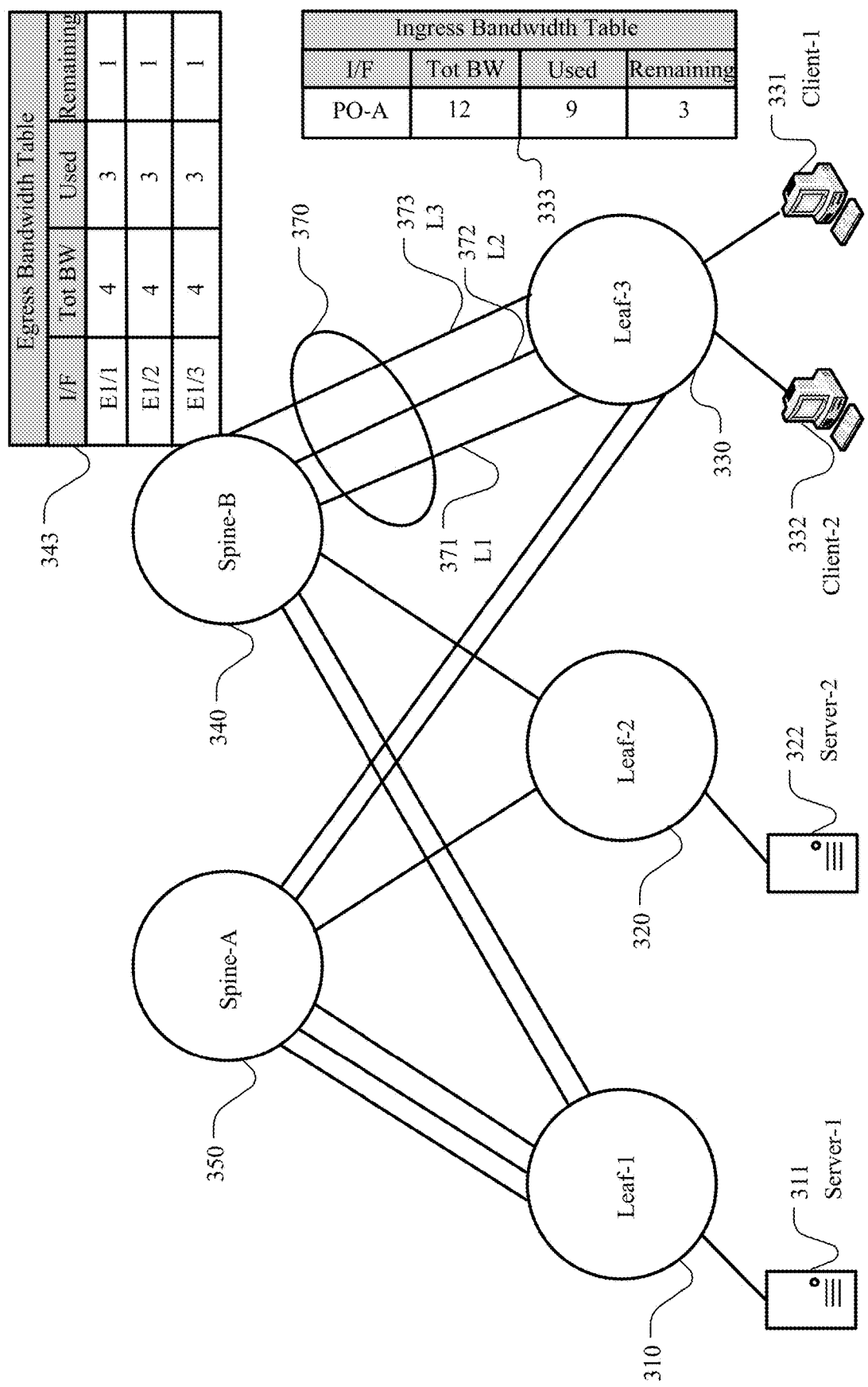
FIG. 3B illustrates an example scenario where a path for a first data stream over the link aggregation group is established.

FIG. 3B illustrates an example scenario where a path for a first data stream over the link aggregation group is established. The used egress bandwidth for the interface E1/3 in the egress bandwidth table 343, connected to link L3, has been updated to 3 Gbps. The remaining egress bandwidth for the interface E1/3 in the egress bandwidth table 343 has been updated to 1 Gbps. The used ingress bandwidth for the link aggregation group 370 in the ingress bandwidth table 333 has been updated to 9 Gbps. The remaining ingress bandwidth for the link aggregation group 370 in the ingress bandwidth table 333 has been updated to 3 Gbps.

In particular embodiments, a second network apparatus 330 may receive, from a client node, a second request to establish a second routing path for a second data stream. In particular embodiments, the second data stream may be a multicast stream. In particular embodiments, the second request may be an IGMP join message requesting for joining to a multicast group. The second request may be associated with a second requested bandwidth for the second data stream. The second network apparatus 330 may identify the first network apparatus 340 from which to receive the second data stream based on routing algorithms. In particular embodiments, the first network apparatus 340 may be a next network apparatus in a reversed routing path based on reverse-path forwarding algorithms. The second data stream may be delivered from a second source node to a second destination node. The second source node may be reachable from the second network apparatus 340. The second destination node may be reachable from the second network apparatus 330. The second routing path may comprise a path from the second source node to the first network apparatus 340, a path from the first network apparatus 340 to the second network apparatus 330, and a path from the second network apparatus 330 to the second destination node. The second network apparatus 330 may access bandwidth information associated with the link aggregation group. The bandwidth information associated with the link aggregation group may be available as an ingress bandwidth table 333. The second network apparatus 330 may determine that the remaining ingress bandwidth associated with the link aggregation group satisfies the second requested bandwidth for receiving the data stream based on the bandwidth information. The second network apparatus 330 may send to the first network apparatus 340 a request for establishing a second path between the first network apparatus to the second network apparatus with the requested bandwidth. In particular embodiments, the second network apparatus 330 may determine that the remaining ingress bandwidth associated with the link aggregation group does not satisfies the second requested bandwidth. In such a case, the second network apparatus 330 may determine an alternative routing path to a source node for the second data stream based on routing algorithms. The second network apparatus 330 may send a request to establish the alternative routing path for the second data stream to a next network apparatus in the reversed alternative routing path. As an example and not by way of limitation, illustrated in FIG. 3B, a client-2 332 may want to join to a multicast group G2 sourced from a server-2 322, which belongs to Leaf-2 320. The multicast stream associated with the multicast group G2 may require 2 Gbps bandwidth. Leaf-3 330 may receive an IGMP Join request from the client-2 332. The IGMP Join request may comprise the requested bandwidth, 2 Gbps. Leaf-3 330 may perform a Multicast Reverse-Path Forwarding (M-RPF) lookup. Leaf-3 330 may identify Spine-B 340 as the next network apparatus in the reversed routing path for the multicast stream based on the M-RPF lookup. Because Leaf-3 330 is connected to Spine-B 340 by a link aggregation group 370, Leaf-3 330 may determine if the remaining ingress bandwidth satisfies the requested bandwidth using the ingress bandwidth table 333. Since the remaining ingress bandwidth 3 Gbps is greater than the requested bandwidth 2 Gbps for the multicast stream, Leaf-3 330 may send a Protocol Independent Multicast (PIM) Join request to Spine-B 340. As another example and not by way of limitation, a client-2 332 may want to join to a multicast group G2 sourced from a server-2 322, which belongs to Leaf-2 320. The multicast stream associated with the multicast group G2 may require 4 Gbps bandwidth. Leaf-3 330 may receive an IGMP Join request from the client-2 332. The IGMP Join request may comprise the requested bandwidth, 4 Gbps. Leaf-3 330 may perform a Multicast Reverse-Path Forwarding (M-RPF) lookup. Leaf-3 330 may identify Spine-B 340 as the next network apparatus in the reversed routing path for the multicast stream based on the M-RPF lookup. The routing path for the multicast stream may comprise a path from the server-2 322 to Spine-B 340, a path from Spine-B 340 to Leaf-3 330, and a path from Leaf-3 330 to the client-2 332. Because Leaf-3 330 is connected to Spine-B 340 by a link aggregation group 370, Leaf-3 330 may determine if the remaining ingress bandwidth satisfies the requested bandwidth using the ingress bandwidth table 333. Since the remaining ingress bandwidth 3 Gbps is less than the requested bandwidth 4 Gbps for the multicast stream, Leaf-3 330 may determine an alternative routing path to the server-2 322, the source node for the multicast stream based on routing algorithms. Leaf-3 330 may send a request to establish the alternative routing path for the second data stream to Spine-A 350, a next network apparatus in the reversed alternative routing path to Sever-2 322. The request may be a PIM Join message. Although this disclosure describes requesting to establish a path over a link aggregation group for a multicast stream in a particular manner, this disclosure contemplates requesting to establish a path over a link aggregation group for a multicast stream in any suitable manner.

In particular embodiments, the first network apparatus 340 may receive a second request to establish a second path for the second data stream. The second path may be from the first network apparatus 340 to the second network apparatus 330. The second request may be associated with the second requested bandwidth for the second data stream. The first network apparatus 340 may access egress bandwidth information representing a plurality of remaining bandwidths of the respective plurality of physical links. The egress bandwidth information may be the egress bandwidth table 343. The first network apparatus 340 may determine that the second requested bandwidth is not satisfied by any of the plurality of remaining bandwidths of the plurality of physical links. To make the determination, the first network apparatus 340 may compare the remaining bandwidth with the second requested bandwidth for each of the plurality of physical links in the link aggregation group. As an example and not by way of limitation, illustrated in FIG. 3B, continuing with a prior example, Spine-B 340 may receive the PIM Join message from Leaf-3 330. The PIM Join message may be associated with the requested bandwidth 2 Gbps. Because Spine-B 340 and Leaf-3 330 are connected by a link aggregation group 370, Spine-B 340 may access the egress bandwidth table 343 to determine whether a remaining bandwidth of any link in the link aggregation group 370 satisfies the requested bandwidth. Currently, the remaining bandwidth for L1 371 is 1 Gbps, the remaining bandwidth for L2 372 is 1 Gbps, and the remaining bandwidth for L3 373 is 1 Gbps. Though the aggregation of the remaining bandwidths of all the links is greater than the requested bandwidth 2 Gbps, no single link has greater than or equal to the requested bandwidth 3 Gbps. Thus, Spine-B 340 may determine that the requested bandwidth 2 Gbps cannot be satisfied by any of the remaining bandwidth of link L1 371, L2 372, and L3 373. Although this disclosure describes determining whether the requested bandwidth is satisfied by any of the plurality of remaining bandwidths of the plurality of physical links in a particular manner, this disclosure contemplates determining whether the requested bandwidth is satisfied by any of the plurality of remaining bandwidths of the plurality of physical links in any suitable manner.

The first network apparatus 340 may send, based on the determination, a response rejecting the second request to establish the second path. The response rejecting the second request may cause the second network apparatus 330 to choose an alternative routing path to the first source node, wherein the alternative routing path does not comprise the second path from the first network apparatus 340 to the second network apparatus 330. The response may be a PIM Equal-Cost Multipath (ECMP) Redirect. As an example and not by way of limitation, illustrated in FIG. 3B, continuing with a prior example, Spine-B 340 may send a PIM ECPM redirect to Leaf-3 330 upon determining that the requested bandwidth 2 Gbps cannot be satisfied by any of the remaining bandwidth of link L1 371, L2 372, and L3 373. Although this disclosure describes sending a response rejecting a request to establish a path over a link aggregation group for a Guaranteed-Bandwidth data stream in a particular manner, this disclosure contemplates sending a response rejecting a request to establish a path over a link aggregation group for a Guaranteed-Bandwidth data stream in any suitable manner.

The second network apparatus 330 may receive the response indicating that the second request is not accepted from the first network apparatus 340. The second network apparatus 330 may determine an alternative routing path to a source node for the data stream based on routing algorithms. The second network apparatus 330 may send to a next network apparatus in the reversed alternative routing path to the source node for the data stream, a request to establish the alternative routing path for the second data stream. As an example and not by way of limitation, illustrated in FIG. 3B, continuing with a prior example, Leaf-3 330 may receive a PIM ECMP Redirect from Spine-B 340. Leaf-3 330 may determine an alternative routing path to the server-2 322, the source node for the multicast stream based on routing algorithms. Leaf-3 330 may send a request to establish the alternative routing path for the second data stream to Spine-A 350, a next network apparatus in the reversed alternative routing path to Sever-2 322. The request may be a PIM Join message. Although this disclosure describes determining an alternative routing path upon receiving a response rejecting the request to establish a path in a particular manner, this disclosure contemplates determining an alternative routing path upon receiving a response rejecting the request to establish a path in any suitable manner.

In particular embodiments, the first network apparatus 340 may detect that the physical link i fails. The first network apparatus 340 may determine, for each data stream associated with the physical link i, whether an alternative physical link among the plurality of physical links can be utilized for the data stream based on the bandwidth information and the requested bandwidth associated with the data stream. The first network apparatus 340 may determine that no active physical link among the plurality of physical links has the remaining bandwidth that satisfies the requested bandwidth for a data stream. In such a case, the first network apparatus 340 may send a message to a network apparatus associated with the data stream to cause that network apparatus to choose a new routing path. The message may be a PIM ECMP Redirect.

Figure 3C:
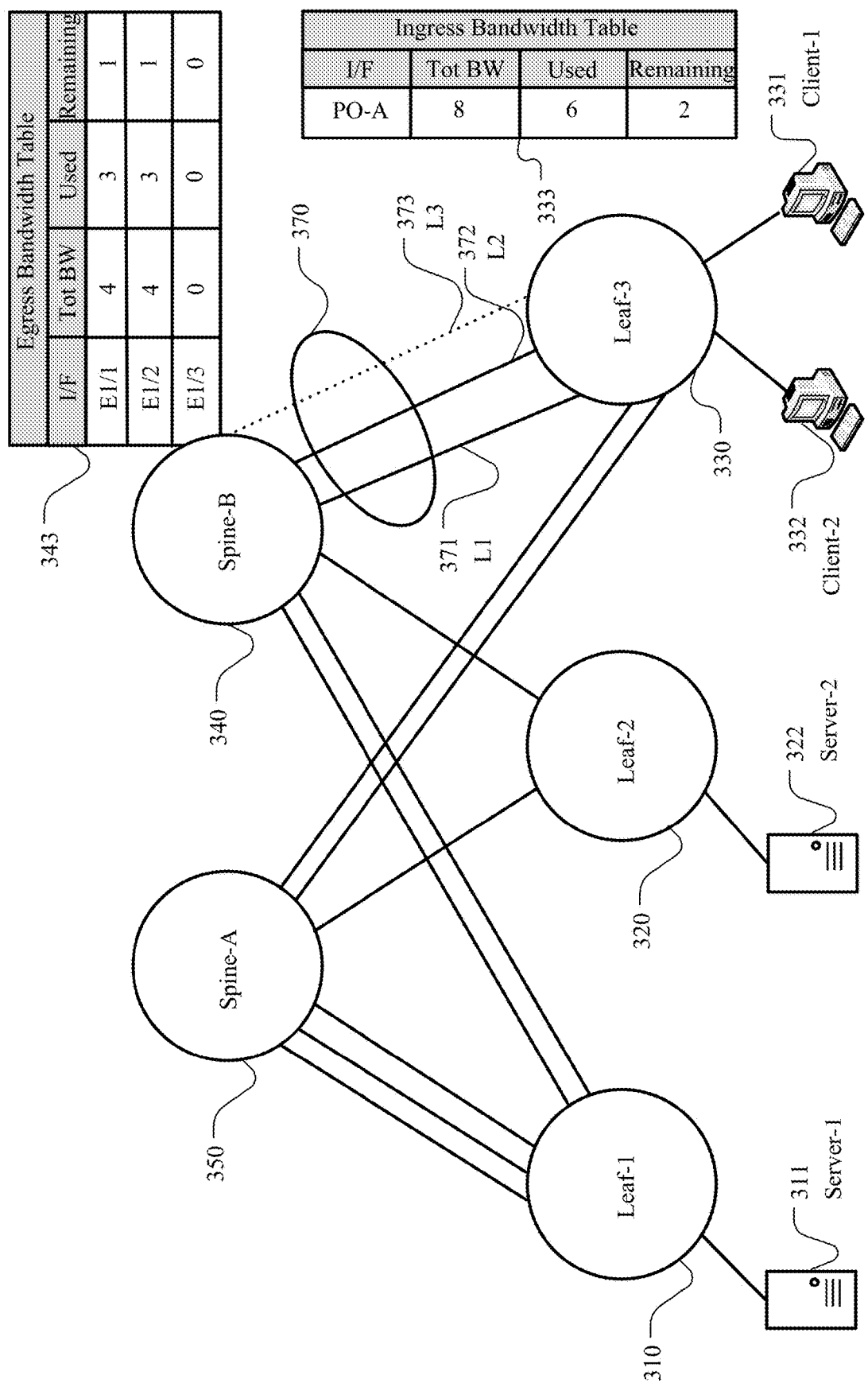
FIG. 3C illustrates an example scenario where a physical link in a link aggregation group fails.

FIG. 3C illustrates an example scenario where a physical link in a link aggregation group fails. As an example and not by way of limitation, illustrated in FIG. 3C, continuing with a prior example, the link L3 373 in the link aggregation group 370 fails. The link L3 373 was associated with the first data stream from the server-1 311 to the client-1 331. The first requested bandwidth associated with the first data stream is 3 Gbps. Upon detecting that the link L3 373 fails, Spine-B 340 may determine whether any link in the link aggregation group 370 can be utilized for the first data stream. The remaining bandwidth for interface E1/1, connected to link L1 371, is 1 Gbps. The remaining bandwidth for interface E1/2, connected to link L2 372, is 1 Gbps. Because both of the remaining bandwidths for link L1 371 and L2 372 are less than the first requested bandwidth 3 Gbps, Spine-B determines that the first data stream cannot be delivered over the link aggregation group 370. Spine-B may send a PIM ECPM Redirect to Leaf-3 to cause Leaf-3 determine an alternative routing path for the first data stream. Although this disclosure describes determining that no alternative physical link for a data stream associated with a failed physical link is available in a link aggregation group in a particular manner, this disclosure contemplates determining that no alternative physical link for a data stream associated with a failed physical link is available in a link aggregation group in any suitable manner.

In particular embodiments, the second network apparatus 330 may receive a message indicating that the first data stream cannot be routed through the link between the first network apparatus and the second network apparatus. The second network apparatus 330 may determine an alternative routing path to a source node for the first data stream based on routing algorithms. The second network apparatus 330 may send a request to establish the alternative routing path for the first data stream to a next network apparatus in the reversed alternative routing path to the source node for the first data stream. As an example and not by way of limitation, illustrated in FIG. 3C, continuing with a prior example, Leaf-3 330 receives the PIM EC MP Redirect from Spine-B 340. Leaf-3 330 may determine an alternative routing path to the server-1 311, the source node for the first data stream based on routing algorithms. Leaf-3 330 may send a request to establish the alternative routing path for the second data stream to Spine-A 350, a next network apparatus in the reversed alternative routing path to Server-1 311. The request may be a PIM Join message. Although this disclosure describes determining an alternative routing path due to a link failure in a particular manner, this disclosure contemplates determining an alternative routing path due to a link failure in any suitable manner.

In particular embodiments, the first network apparatus 340 may detect that the physical link i fails. The physical link i may be associated with a data stream. The data stream is associated with a requested bandwidth. The first network apparatus 340 may determine, based on the bandwidth information and the requested bandwidth associated with the data stream, whether an alternative physical link among the plurality of physical links can be used for the data stream. The first network apparatus 340 may determine that the remaining bandwidth of a physical link k among the plurality of physical links satisfies the requested bandwidth. The first network apparatus may update the bandwidth information associated with the physical link k based on the requested bandwidth. The data stream may be re-hashed into the physical link k.

Figure 3D:
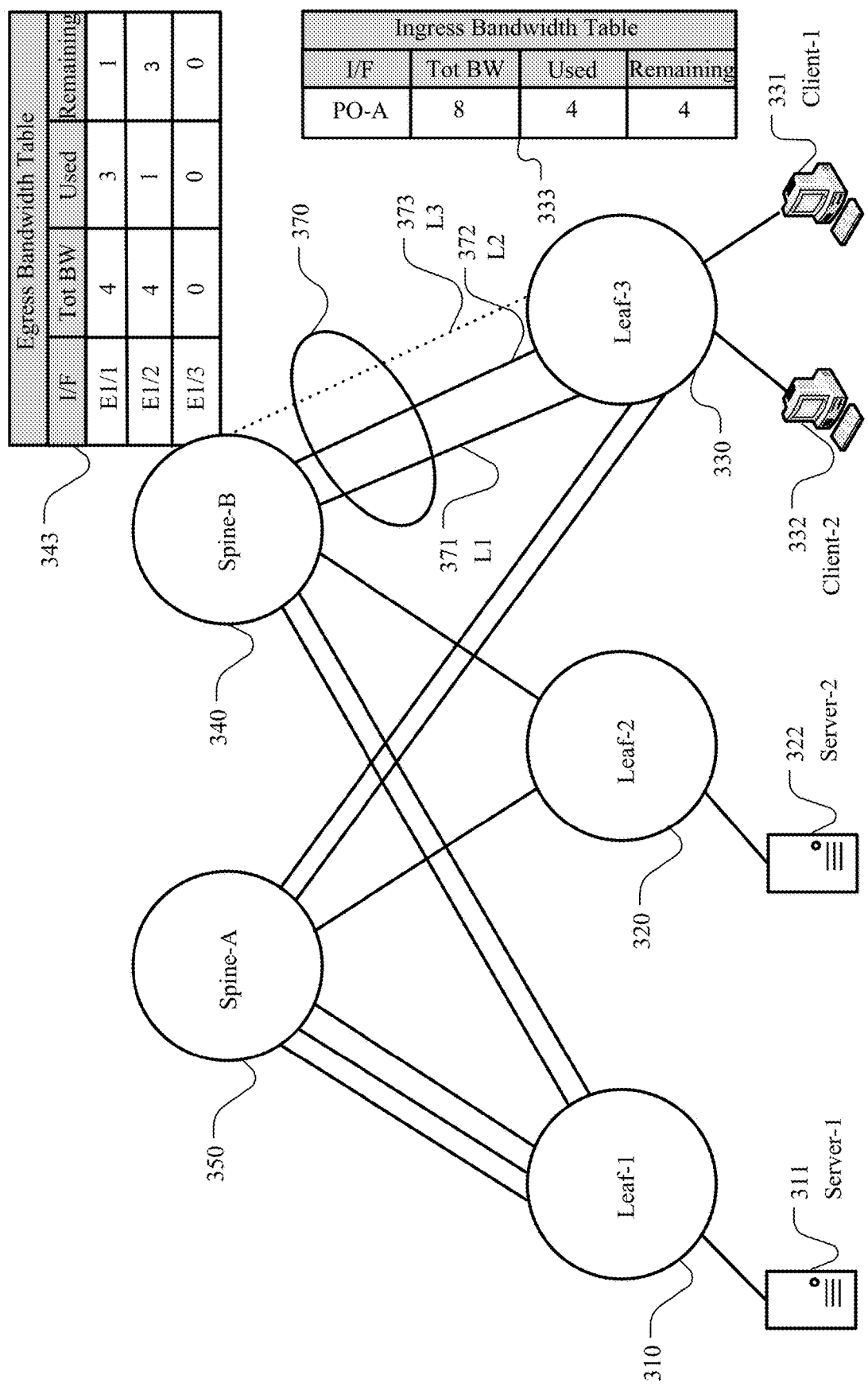
FIG. 3D illustrates another example scenario where a physical link in a link aggregation group fails.

FIG. 3D illustrates another example scenario where a physical link in a link aggregation group fails. As an example and not by way of limitation, illustrated in FIG. 3D, the link L3 373 in the link aggregation group 370 fails. The link L3 373 was associated with the first data stream from the server-1 311 to the client-1 331. The first requested bandwidth associated with the first data stream is 3 Gbps. The link L2 is currently associated with a second data stream. A requested bandwidth associated with the second data stream is 1 Gbps. Thus, the remaining bandwidth of the link L2 is 3 Gbps. Upon detecting that the link L1 fails, Spine-B 340 may determine that the remaining bandwidth of the link L2 satisfies the first requested bandwidth associated with the first data stream by accessing the egress bandwidth table 343. Spine-B 340 may update the egress bandwidth table 343 by adding the first requested bandwidth 3 Gbps to the used bandwidth of the link L2 and subtracting the first requested bandwidth 3 Gbps from the remaining bandwidth of the link L2. The first data stream may be re-hashed into the link L2. Spine-B 340 does not send a message to Leaf-3, the ingress network apparatus for the first data stream. Although this disclosure describes determining an alternative physical link in a link aggregation group due to a link failure in a particular manner, this disclosure contemplates determining an alternative physical link in a link aggregation group due to a link failure in any suitable manner.

In particular embodiments, one or more physical links may be added to a link aggregation group 370. A link addition (or a deletion) to a link aggregation group may cause hash values for the data streams associated with the link aggregation group changed. Then, the data streams may experience service disruptions. The first network apparatus 340 may not change the hash values for the data streams associated with the link aggregation group when one or more physical links are added to a link aggregation group 370 to prevent service disruptions on the data streams from happening. Although this disclosure describes preventing service disruptions on the data streams associated with a link aggregation group when one or more links are added to the link aggregation group in a particular manner, this disclosure contemplates preventing service disruptions on the data streams associated with a link aggregation group when one or more links are added to the link aggregation group in any suitable manner.

Figure 4:
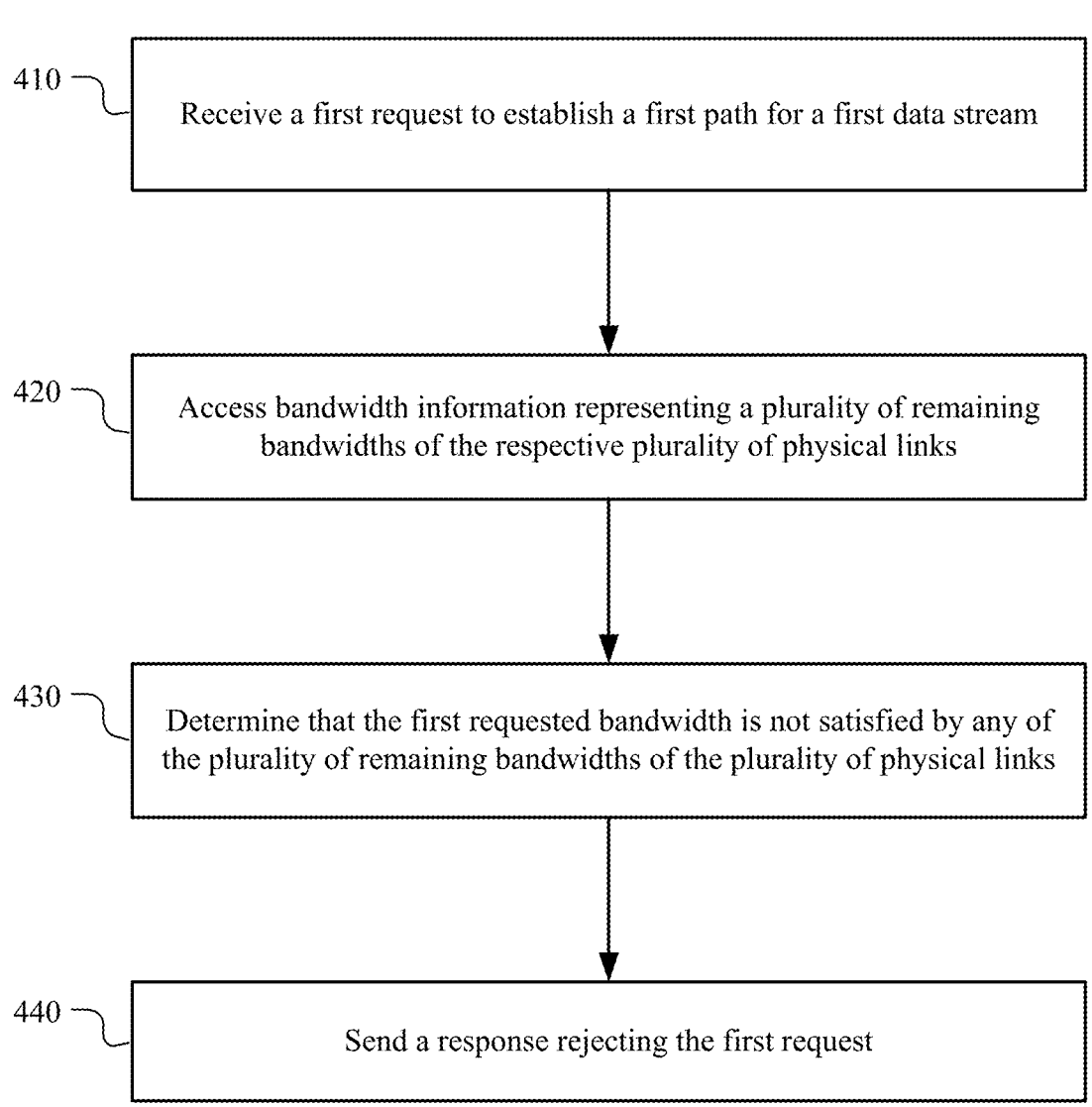
FIG. 4 illustrates an example method for processing a request to establish a path over a link aggregation group for a guaranteed-bandwidth data stream.

FIG. 4 illustrates an example method 400 for processing a request to establish a path over a link aggregation group for a guaranteed-bandwidth data stream. The method may begin at step 410, where the first network apparatus may receive a first request to establish a first path for a first data stream from the first network apparatus to a second network apparatus. The first request may be associated with a first requested bandwidth for the first data stream. The first network apparatus and the second network apparatus may be connected by a link aggregation group comprising a plurality of physical links. At step 420, the first network apparatus may access bandwidth information representing a plurality of remaining bandwidths of the respective plurality of physical links. At step 430, the first network apparatus may determine that the first requested bandwidth is not satisfied by any of the plurality of remaining bandwidths of the plurality of physical links. At step 440, the first network apparatus may send a response rejecting the first request to establish the first path based on the determination. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for processing a request to establish a path over a link aggregation group for a guaranteed-bandwidth data stream including the particular steps of the method of FIG. 4, this disclosure contemplates any suitable method for processing a request to establish a path over a link aggregation group for a guaranteed-bandwidth data stream including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
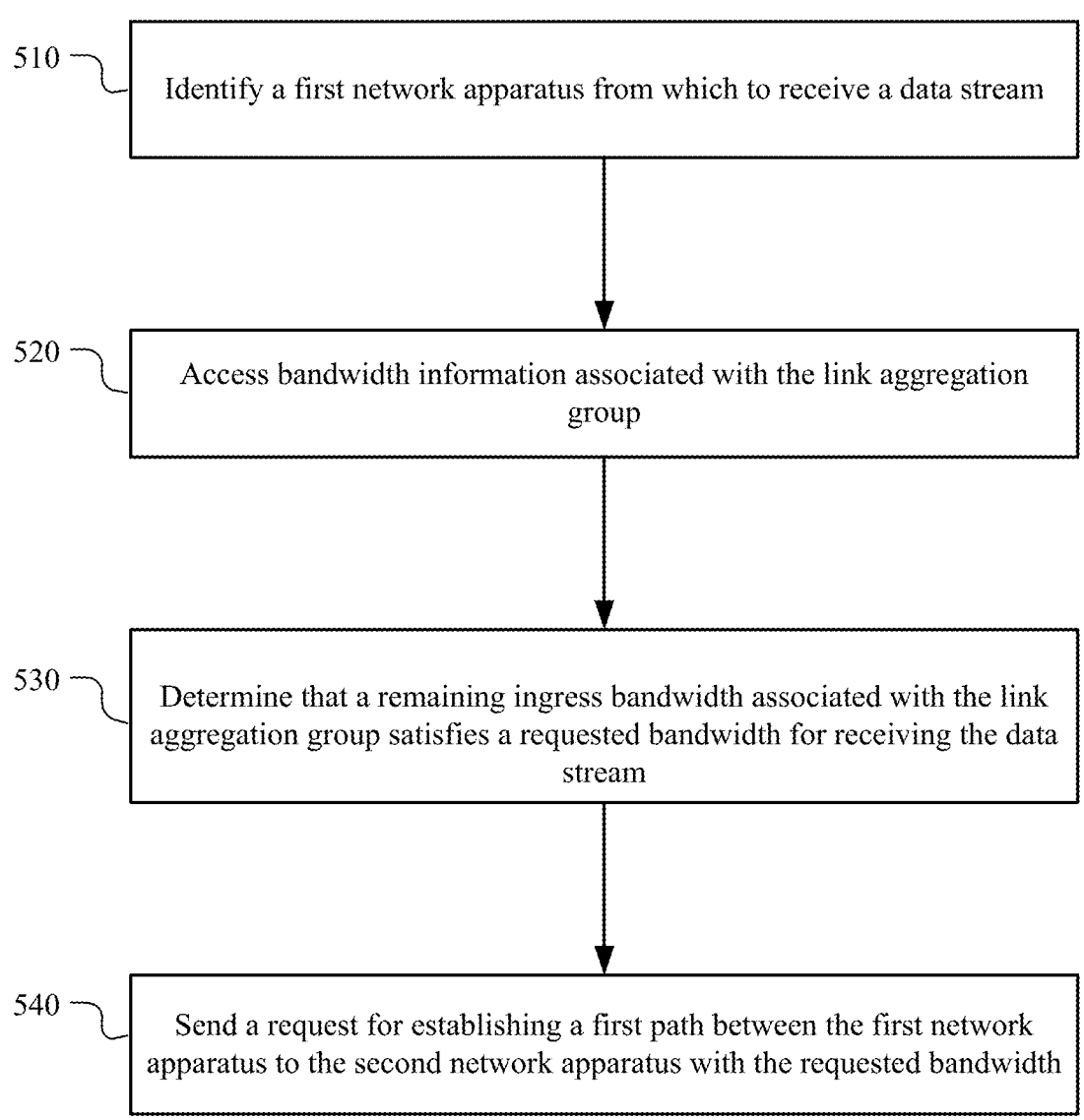
FIG. 5 illustrates an example method for requesting to establish a path over a link aggregation group for a guaranteed-bandwidth data stream.

FIG. 5 illustrates an example method 500 for requesting to establish a path over a link aggregation group for a guaranteed-bandwidth data stream. The method may begin at step 510, where the second network apparatus may identify a first network apparatus from which to receive a data stream, wherein the first network apparatus and the second network apparatus are connected by a link aggregation group comprising a plurality of physical links. At step 520, the second network apparatus may access bandwidth information associated with the link aggregation group. At step 530, the second network apparatus may determine that a remaining ingress bandwidth associated with the link aggregation group satisfies a requested bandwidth for receiving the data stream based on the bandwidth information. At step 540, the second network apparatus may send a request for establishing a first path between the first network apparatus to the second network apparatus with the requested bandwidth to the first network apparatus. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for requesting to establish a path over a link aggregation group for a guaranteed-bandwidth data stream including the particular steps of the method of FIG. 5, this disclosure contemplates any suitable method for requesting to establish a path over a link aggregation group for a guaranteed-bandwidth data stream including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
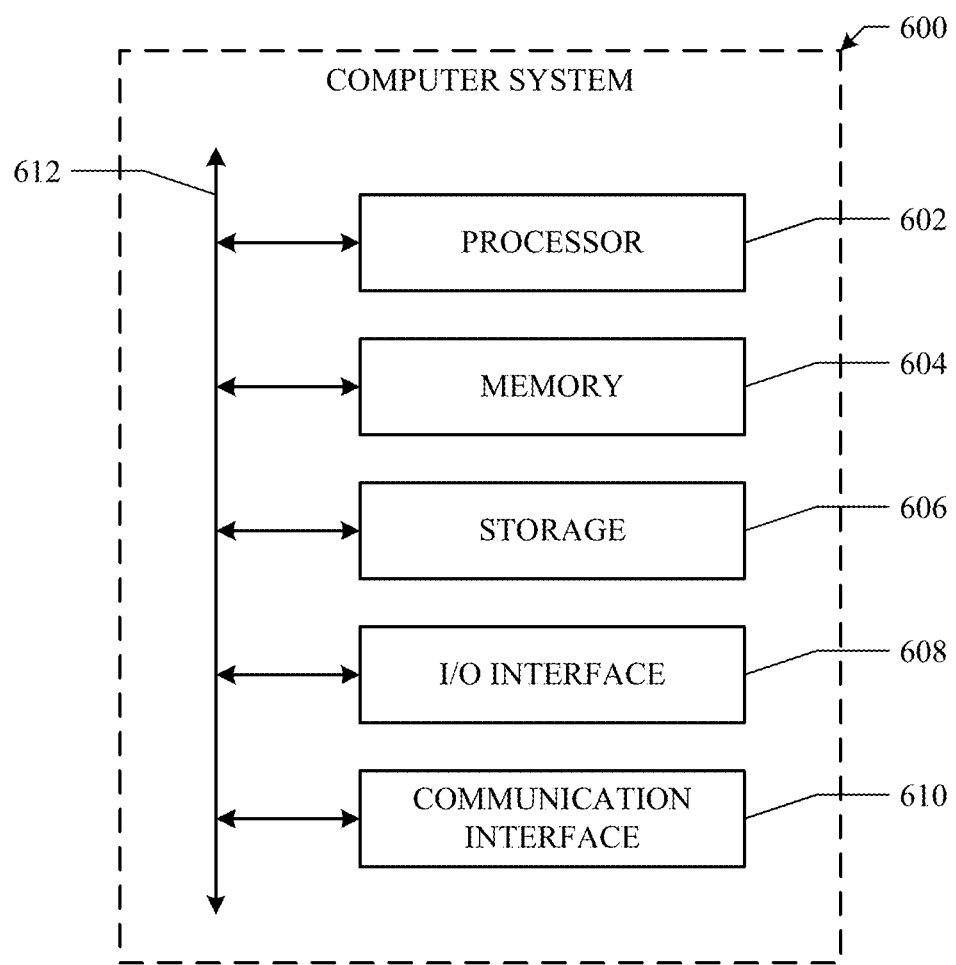
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A first network apparatus, comprising:
one or more processors; and
one or more computer-readable non-transitory storage media coupled to the one or more processors and comprising instructions operable when executed by the one or more processors to cause the first network apparatus to:
receive a first request to establish a first path for a first data stream from the first network apparatus to a second network apparatus, wherein the first request is associated with a first requested bandwidth for the first data stream, and wherein the first network apparatus and the second network apparatus are connected by a link aggregation group comprising a plurality of physical links;
access bandwidth information representing a plurality of remaining bandwidths of the respective plurality of physical links;
determine that the remaining bandwidth of a physical link i among the plurality of physical links satisfies the first requested bandwidth;
update the bandwidth information associated with the physical link i based on the first requested bandwidth;
detect that the physical link i fails; and
determine, based on the bandwidth information and the first requested bandwidth, whether an alternative physical link among the plurality of physical links can be used for the first path.

2. The first network apparatus of claim 1, wherein the first data stream is delivered from a first source apparatus to a first destination apparatus, wherein the first source apparatus is reachable from the first network apparatus, and wherein the first destination apparatus is reachable from the second network apparatus.

3. The first network apparatus of claim 1, wherein the first data stream is a multicast stream, and wherein the first request to establish the first path is a request to join to a multicast group.

4. The first network apparatus of claim 1, wherein the one or more processors are further operable when executing the instructions to update the bandwidth information for the link aggregation group, wherein the bandwidth information associated with each of the plurality of physical links is updated based on any egress bandwidth allocated to any stream utilizing that physical link.

5. The first network apparatus of claim 1, wherein the one or more processors are further operable when executing the instructions to:
  determine that the remaining bandwidth of a physical link k among the plurality of physical links satisfies the first requested bandwidth;
  update the bandwidth information associated with the physical link k based on the first requested bandwidth.

6. The first network apparatus of claim 1, wherein the one or more processors are further operable when executing the instructions to:
  determine that no active physical link among the plurality of physical links has the remaining bandwidth that satisfies the first requested bandwidth; and
  send a message to the second network apparatus to cause the second network apparatus to choose a new routing path.

7. The first network apparatus of claim 1, wherein the one or more processors are further operable when executing the instructions to:
  receive a second request to establish a second path for a second data stream from the first network apparatus to the second network apparatus, wherein the second request is associated with a second requested bandwidth for the second data stream;
  determine that the second requested bandwidth is not satisfied by any of the plurality of remaining bandwidths of the plurality of physical links; and
  send, based on the determination, a response rejecting the second request to establish the second path.

8. The first network apparatus of claim 7, wherein the second data stream is delivered from a second source apparatus to a second destination apparatus, wherein the second source apparatus is reachable from the first network apparatus, and wherein the second destination apparatus is reachable from the second network apparatus.

9. The first network apparatus of claim 8, wherein the response rejecting the second request causes the second network apparatus to choose an alternative routing path to the second source apparatus, wherein the alternative routing path does not comprise the second path.

10. A second network apparatus, comprising:
  one or more processors; and
  one or more computer-readable non-transitory storage media coupled to the one or more processors and comprising instructions operable when executed by the one or more processors to cause the second network apparatus to:
    identify a first network apparatus from which to receive a data stream, wherein the first network apparatus and the second network apparatus are connected by a link aggregation group comprising a plurality of physical links;
    access bandwidth information associated with the link aggregation group;
    determine, based on the bandwidth information, that a remaining ingress bandwidth associated with the link aggregation group satisfies a requested bandwidth for receiving the data stream;
    send, to the first network apparatus, a request for establishing a first path between the first network apparatus to the second network apparatus with the requested bandwidth;
    receive, from the first network apparatus, a response indicating the request is rejected;
    determine a reversed alternative routing path to a source apparatus for the data stream based on routing algorithms; and
    send to a next network apparatus in the reversed alternative routing path to the source apparatus for the data stream, a request to establish the alternative routing path for the first multimedia stream.

11. The second network apparatus of claim 10, wherein the one or more processors are further operable when executing the instructions to update the bandwidth information for the link aggregation group, wherein the bandwidth information associated with the link aggregation group is updated based on any ingress bandwidth allocated to any ingress stream over the link aggregation group.

12. A method by a first network apparatus, comprising:
  receiving a first request to establish a first path for a first data stream from the first network apparatus to a second network apparatus, wherein the first request is associated with a first requested bandwidth for the data transmission, wherein the first network apparatus and the second network apparatus are connected by a link aggregation group comprising a plurality of physical links;
  accessing bandwidth information representing a plurality of remaining bandwidths of the respective plurality of physical links;
  determining that the remaining bandwidth of a physical link i among the plurality of physical links satisfies the first requested bandwidth;
  updating the bandwidth information associated with the physical link i based on the first requested bandwidth;
  detecting that the physical link i fails; and
  determining, based on the bandwidth information and the first requested bandwidth, whether an alternative physical link among the plurality of physical links can be used for the first path.

13. The method of claim 12, wherein the first data stream is delivered from a first source node to a first destination node, wherein the first source node is reachable from the first network apparatus, and wherein the first destination node is reachable from the second network apparatus.

14. The method of claim 12, wherein the first data stream is a multicast stream, and wherein the first request to establish the first path is a request to join to a multicast group.

15. The method of claim 12, further comprising updating the bandwidth information for the link aggregation group, wherein the bandwidth information associated with each of the plurality of physical links is updated based on any egress bandwidth allocated to any stream utilizing that physical link.

16. The method of claim 12, further comprising
determining that the remaining bandwidth of a physical link k among the plurality of physical links satisfies the first requested bandwidth;
updating the bandwidth information associated with the physical link k based on the first requested bandwidth.

17. The method of claim 12, further comprising:
receiving a second request to establish a second path for a second data stream from the first network apparatus to the second network apparatus, wherein the second request is associated with a second requested bandwidth for the second data stream;
determining that the second requested bandwidth is not satisfied by any of the plurality of remaining bandwidths of the plurality of physical links; and
sending, based on the determination, a response rejecting the second request to establish the second path.

18. The method of claim 17, wherein the second data stream is delivered from a second source apparatus to a second destination apparatus, wherein the second source apparatus is reachable from the first network apparatus, and wherein the second destination apparatus is reachable from the second network apparatus.

19. The method of claim 18, wherein the response rejecting the second request causes the second network apparatus to choose an alternative routing path to the second source apparatus, wherein the alternative routing path does not comprise the second path.

\* \* \* \* \*